United States Patent
Messaoudi (10) Patent No.: US 10,260,191 B2
(45) Date of Patent: Apr. 16, 2019

(54) BALANCING DEVICE FOR A MACHINE WITH ROTATABLE DRUM, AND MACHINE INCLUDING A ROTATABLE DRUM PROVIDED WITH SUCH A DEVICE

(71) Applicant: AMNC INNOVATIONS, Vanves (FR)

(72) Inventor: Ali Messaoudi, Le Perreux sur Marne (FR)

(73) Assignee: AMNC INNOVATIONS, Vanves (FR)

( * ) Notice: Subject to any disclaimer, the term of this patent is extended or adjusted under 35 U.S.C. 154(b) by 0 days.

(21) Appl. No.: 15/550,049

(22) PCT Filed: Feb. 11, 2016

(86) PCT No.: PCT/FR2016/050308
§ 371 (c)(1),
(2) Date: Aug. 10, 2017

(87) PCT Pub. No.: WO2016/128681
PCT Pub. Date: Aug. 18, 2016

(65) Prior Publication Data
US 2018/0030639 A1  Feb. 1, 2018

(30) Foreign Application Priority Data
Feb. 13, 2015 (FR) ................................. 15 51207

(51) Int. Cl.
*D06F 37/22* (2006.01)
*D06F 37/24* (2006.01)
*F16F 15/36* (2006.01)

(52) U.S. Cl.
CPC .......... *D06F 37/225* (2013.01); *D06F 37/245* (2013.01); *F16F 15/366* (2013.01)

(58) Field of Classification Search
CPC ... F01L 2001/34453; F01L 2001/34469; F01L 2001/34456; F01L 2001/34459; F01L 2001/34466; F01L 2001/34476; D06F 37/225; D06F 37/245; F16F 15/366
See application file for complete search history.

(56) References Cited

U.S. PATENT DOCUMENTS

| | | | |
|---|---|---|---|
| 2,695,047 A | 11/1954 | Ruck | |
| 2011/0120192 A1* | 5/2011 | Song | D06F 37/245 68/23.2 |
| 2011/0162442 A1* | 7/2011 | Ronlan | D06F 37/22 73/66 |

FOREIGN PATENT DOCUMENTS

| | | |
|---|---|---|
| EP | 1 634 986 A1 | 3/2006 |
| WO | 2010/029112 A1 | 3/2010 |
| WO | 2013/087722 A1 | 6/2013 |

OTHER PUBLICATIONS

International Search Report, dated May 23, 2016, from corresponding PCT/FR2016/050308 application.

* cited by examiner

*Primary Examiner* — Jeremy R Severson
(74) *Attorney, Agent, or Firm* — Young & Thompson (57) ABSTRACT

The invention relates to a device for balancing a machine with a rotary drum, the device comprising at least one balancing ring (20) for mounting coaxially on the rotary drum, which ring presents an inside space (51) subdivided into a plurality of distinct channels (52), said channels (52) extending around the axis of said balancing ring over its entire circumference. According to the invention, at least a portion of the channels (52) each present in at least one direction an inside dimension (b) that is not zero and less than or equal to 3 millimeters.

15 Claims, 4 Drawing Sheets

BALANCING DEVICE FOR A MACHINE WITH ROTATABLE DRUM, AND MACHINE INCLUDING A ROTATABLE DRUM PROVIDED WITH SUCH A DEVICE

TECHNICAL FIELD TO WHICH THE INVENTION RELATES

The present invention relates in general manner to the field of balancing devices for rotary elements.

More particularly, the invention relates to a device for balancing a machine with a rotary drum, the device comprising at least one balancing ring for mounting coaxially on the rotary drum, which ring presents an inside space subdivided into a plurality of distinct channels, said channels extending around the axis of said balancing ring over its entire circumference.

The invention applies in particularly advantageous manner to balancing a rotary drum of a washing machine that includes in particular a spin drying function.

TECHNOLOGICAL BACKGROUND

The rotary movement of a rotary element of a machine, such as for example a drum of a washing machine, a centrifuge, or indeed a turbine, can lead to strong and harmful vibration being generated if the element does not present a distribution of mass that is balanced relative to its axis of rotation.

Such vibration is particularly pronounced for machines in which the drum rotating at high speed contains a free mass. This applies in particular to washing machines while spin drying.

In general manner, when beginning a stage of spin drying, the laundry contained in the drum of the washing machine is situated against the inside face of the cylindrical side wall of the drum, and it is distributed thereon in non-uniform manner. The laundry then represents a mass having its center of gravity that is off-center relative to the axis of rotation of the drum.

Because of its off-center position, the mass of laundry contained in the rotary drum exerts stresses on the drum which cause rotation of the drum to be accompanied by substantially circular movement of its axis. A drum is the observed to be rotating in unbalanced manner.

This unbalance, combined with high speeds of rotation (during spin drying) leads to high levels of vibration and of sound nuisance.

In order to attenuate this harmful vibration phenomenon, it is known to fit the drum of a washing machine with a balancing device seeking to avoid axial unbalance of said drum rotating at high speed.

One such device is known in particular from Document EP 1 634 986, comprising a balancing ring having mutually distinct channels that are filled in part with a balancing liquid.

Under the effect of the substantially circular movement of the axis of the drum, the balancing liquid in that device takes up a position in the channels of the balancing ring so as to be diametrically opposite the mass of laundry contained in the drum.

The assembly comprising the drum, the laundry it contains, the balancing ring, and the balancing liquid contained therein, thus becomes balanced relative to the axis of rotation of the drum, thereby substantially reducing the vibration generated by its rotation.

Such a balancing effect can thus be obtained for a home washing machine at speeds of rotation that may reach 200 revolutions per minute (rpm), for example.

For higher speeds of rotation, the centrifugal force that acts on the balancing liquid becomes preponderant compared with the inertial force associated with the substantially circular movement of the axis of the drum. That movement then no longer suffices to cause the balancing liquid to take up a position that is diametrically opposite the mass of laundry. In particular under the effect of the centrifugal force to which it is subjected, the balancing liquid contained in each channel becomes spread out over substantially the entire length of the channel. The unbalance due to the mass of laundry for spin drying is then no longer compensated by the balancing liquid, and the rotary motion of the drum is once more unbalanced and is accompanied by high levels of vibration.

Such a balancing device is thus of very little use in reducing the vibration generated by the rotation of a washing machine drum during spin drying, which rotation can typically reach a speed lying in the range 400 rpm to 1800 rpm.

In general manner, a balancing device such as that described in Document EP 1 634 986 is of little effect in balancing a rotary element that contains a free mass and that is subjected to high speeds of rotation, such as for example a drum of a centrifuge or of a washing machine.

Also known from Document WO 2010/029112 is a balancing device for a rotary drum that comprises a balancing ring with channels that are partially filled with a balancing substance having thixotropic properties. That substance is essentially solid at rest. It liquefies under the effect of the machine vibrating and then spreads out in the channel containing it. Document WO 2013/087722 describes such a balancing device, in which the sections of the channels can also be deformed.

SUMMARY OF THE INVENTION

Compared with the above-mentioned state of the art, the present invention proposes a novel balancing device as defined in the introduction wherein at least a portion of the channels each present in at least one direction an inside dimension that is not zero and less than or equal to 3 millimeters.

The term "drum" is used herein to refer equally well to a rotary hollow cylinder such as a washing machine drum, or to a rotary solid cylinder, such as a turbine engine shaft.

The term "inside dimension" of a channel is used herein to designate a distance that it presents internally, that is representative of its extent in that direction, and that is thus not zero.

More precisely, such an inside dimension designates a distance representative of the extent of a right section of the channel.

A right section of the channel, referred to more simply below as the section of the channel, may be of any shape.

By way of example, an inside dimension of the channel may correspond to the diameter of a circle inscribed inside the section, or to a mean inside width of the section in a given direction. It should be recalled that the circle inscribed inside such a section corresponds to the circle having the greatest possible radius that can be contained inside the section.

An inside dimension of the channel may thus designate:
the inside diameter of the section of the channel when it is circular;

the minor inside diameter of the section when it is elliptical;

the inside width of this section when it is rectangular, in particular square;

a height of the inside outline of the section when the outline forms a trapezoid or a parallelogram; or a height or a side of the inside outline of the section when the outline forms a triangle, or indeed the diameter of the inscribed circle of the triangle.

Each of the channels of the balancing ring of the balancing device of the invention is preferably filled with a balancing liquid occupying a volume lying in the range one-fourth to three-fourths of the inside volume of said channel.

When the balancing ring rotates about its axis, the centrifugal force acting on the balancing liquid tends to spread it over the entire circumferential length of the corresponding channel, at a maximum distance from the axis of the balancing ring.

In contrast, in order to reduce the area of the free surface of the balancing liquid, the surface tension that acts on that free surface tends to keep the balancing liquid in the form of a column of liquid occupying a segment only of said channel, but over its entire section. The free surface of the column of liquid forms two meniscuses, each bearing against the inside face of the wall of each corresponding channel, in particular against the portion of the inside face of that wall that is the closest to the axis of the balancing ring.

When the speed of rotation of the balancing device of the invention rises, and reaches 800 rpm for example, each channel of the balancing ring is advantageously sufficiently narrow to ensure that the above-described surface tension effect dominates over the effect of the centrifugal force to which the balancing liquid is subjected, thereby preventing the balancing liquid from spreading over the entire length of the corresponding channel.

The balancing liquid of the balancing device in accordance with the invention then remains localized over a portion only of the length of said channels of the balancing ring, whereby it can advantageously perform a function of balancing a rotary drum on which said balancing ring is coaxially mounted, including at high speeds of rotation, e.g. typically during a stage of spin drying in a washing machine.

According to an advantageous characteristic of the balancing device in accordance with the invention, said inside dimension of each of said channels lies in the range 0.5 millimeters to 2 millimeters.

Such channels are then sufficiently narrow for the balancing liquid they contain (an aqueous solution) to remain localized over a portion only of the length of said channels under the effect of surface tension, as explained above, up to speeds of rotation of about 1500 rpm for a rotary drum having a diameter of about 0.5 meters (m) on which the balancing ring is mounted.

Other characteristics of a balancing device of the invention that are non-limiting and advantageous are as follows:

each channel of said portion of said channels presents:

a section lying in the range 2 square millimeters to 4 square millimeters;

a section of less than 2 square millimeters; and a wall that defines a closed inside volume.

In a preferred embodiment, the invention makes provision for said channels together to form a single-piece strip of flexible plastics material that is wound to form a flexible ring, two ends of said strip being joined together in leaktight manner by a junction element providing continuity for the inside volume of each channel.

The fact that all of the channels form a single-piece flexible strip makes such a balancing ring easier to manipulate and assemble.

Such a flexible strip may advantageously be made by extruding a plastics material through a die.

This provision is thus particularly advantageous in terms of production and assembly costs.

The invention also proposes a machine including a rotary drum fitted with a balancing device in accordance with the invention.

Preferably, provision may be made in the invention for the rotary drum of the machine to be fitted with another balancing device of the invention, the two balancing devices being mounted respectively in the proximity of two opposite ends of the cylindrical wall of said rotary drum.

Having at least two balancing rings situated in this way at different positions along the axis of the rotary drum thus makes it possible not only to correct the static unbalance of the drum, but also to correct its couple unbalance.

When the machine of the invention is a washing machine, the distribution of the balancing liquid within the balancing ring of each balancing device serves to adjust the overall position of the center of gravity of the balancing liquid as a whole in such a manner as to cause it to coincide along the axis of the drum with the position of the laundry contained therein. The rotary drum is thus balanced as well as possible as a function of the way the laundry is distributed against the inside face of its cylindrical side wall.

DETAILED DESCRIPTION OF AN EMBODIMENT

The following description with reference to the accompanying drawings, given as non-limiting examples, shows clearly what the invention consists in and how it can be made.

The term "washing machine" is used herein to designate any machine for processing laundry, and including a rotary washing drum contained in a vessel. This term thus covers in particular machines for washing and/or spin drying laundry, and also machines for washing, spin drying, and drying laundry.

Figure 1:
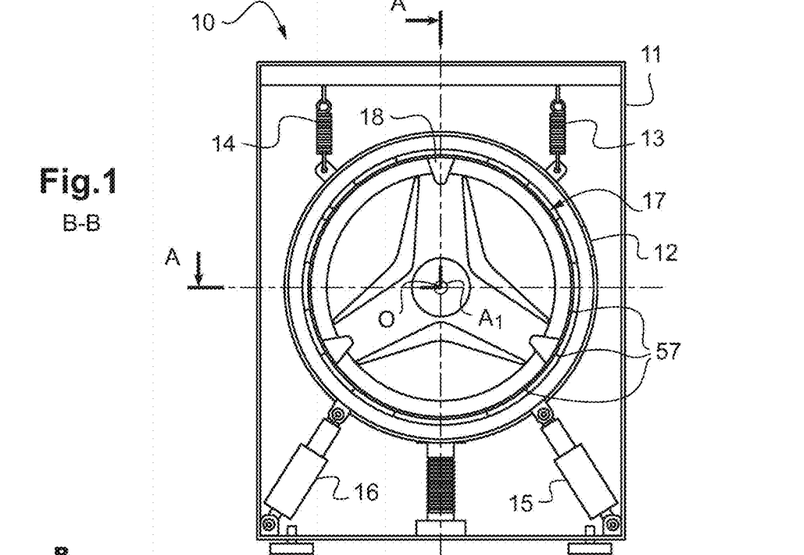
FIG. 1 is a diagrammatic view on section B-B of a washing machine of the invention, as shown in FIG. 2.

The washing machine 10 of the invention, shown diagrammatically in section and while stationary in FIG. 1, comprises in particular a cabinet 11 and a vessel 12 that is generally cylindrical in shape, being suspended from the cabinet 11 by springs 13 and 14.

The vessel 12 contains a rotary drum 17 of horizontal axis that is to receive the laundry to be processed. The rotary drum 17 is mounted to rotate inside the vessel 12 and can thus rotate about its axis A1 relative to the vessel 12.

The vessel 12 is designed to receive a liquid enabling the laundry contained in the rotary drum 17 to be washed, to be rinsed, or indeed to receive liquid extracted from the laundry contained in the rotary drum 17 during a stage of spin drying.

In particular when the rotary drum 17 contains laundry for processing, rotation of the drum 17 leads to oscillating motion of the washing block, i.e. of the assembly comprising the vessel 12 and the rotary drum 17.

In its bottom portion, the vessel 12 has two damper devices 15 and 16, e.g. hydraulic dampers, connecting the vessel 12 to the cabinet 11 of the washing machine 10, and contributing to damping the above-mentioned oscillatory motion of the washing block.

Figure 2:
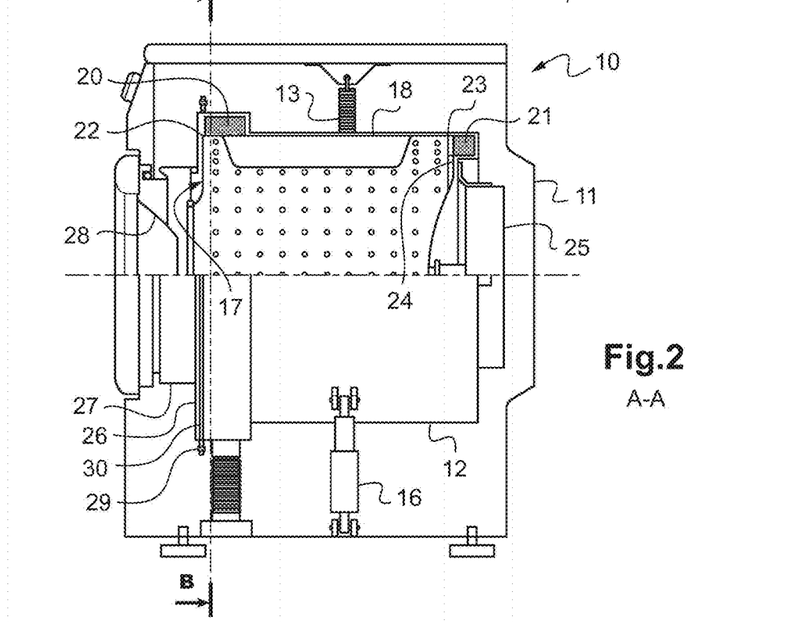
FIG. 2 is a diagrammatic section view on section A-A of the FIG. 1 washing machine.
Figure 3:
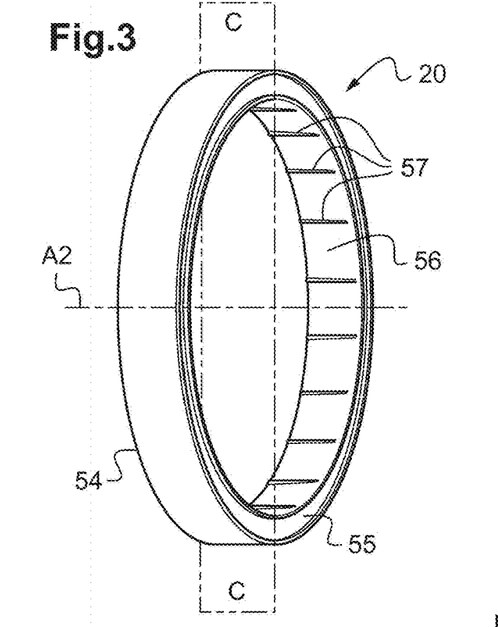
FIG. 3 is a diagrammatic perspective view of a balancing ring of a first balancing device of the FIG. 1 washing machine.
Figure 4:
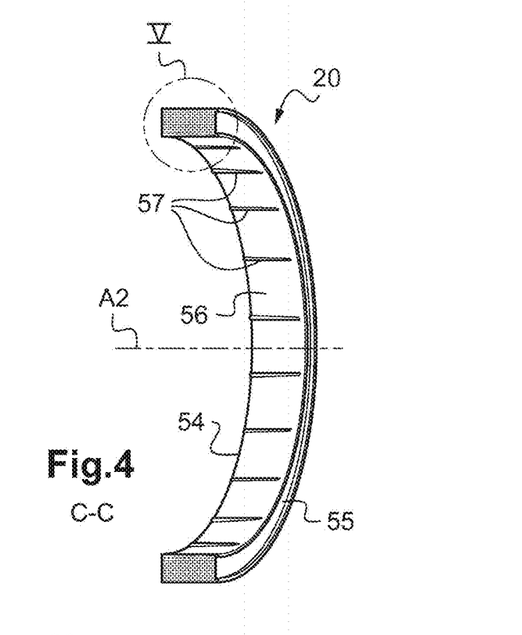
FIG. 4 is a section view on plane C-C of the FIG. 3 balancing ring.

As shown better in FIG. 2, the rotary drum 17 comprises in particular a cylindrical wall 18 that constitutes its side wall, being defined by a first end 22, which forms a circular edge, and by a second end 23 opposite from the first end 22 and likewise forming a circular edge in this example. The rotary drum 17 is closed at one end by a rear wall 24 that extends from the second end 23 of the cylindrical wall 18 to the axis A1 of the drum, being substantially in the form of a disk.

In conventional manner, the rotary drum 17 is set into rotation relative to the vessel 12 by means of an electric motor 25 secured to the vessel 12 and situated beside the rear wall 24 of the rotary drum 17.

At its end remote from the motor 25, the vessel 12 has a wall 26 that extends from an end of the substantially cylindrical side wall of the vessel 12 towards the axis of the vessel. The wall 26 is connected by a gasket 27 to a circular hatch 28 positioned substantially on the axis of the vessel. In the closed position, the circular hatch 28 closes the vessel 12 in leaktight manner. In the open position, it enables laundry to be put into the rotary drum 17 or taken out from it.

The rotary drum 17 is installed inside the vessel 12 by removing the wall 26, which is removable. Once the drum has been installed, the wall 26 is fastened to the substantially cylindrical side wall of the vessel 12 by fastener elements 29. An annular gasket 30 contributing to making the vessel 12 watertight, is interposed between the wall 26 and the substantially cylindrical side wall of the vessel 12.

The arrangement of the rotary drum 17 and of the vessel 12 suspended in the cabinet 11 of the washing machine 10 does not form part of the invention, properly speaking, and it is not described in greater detail herein.

According to a remarkable characteristic of the machine 10, the rotary drum 17 is fitted with at least one balancing device comprising a balancing ring 20; 21 as described in detail below.

In this example, the rotary drum 17 is preferably provided with two balancing devices, each comprising one balancing ring 20 or 21.

The balancing ring 20 of the first balancing device is mounted coaxially on the rotary drum 17 in the proximity of the first end 22 of the cylindrical wall 18. In this example, the balancing ring 20 of the first balancing device is engaged externally on the rotary drum 17. It bears against a zone of the outside face of the cylindrical wall 18 of the rotary drum that extends from the first end 22 of this wall. The balancing ring 20 of the first balancing device is fastened to the rotary drum 17, e.g. by being engaged as a force fit thereon.

The balancing ring 21 of the second balancing device is mounted, likewise coaxially, on the rotary drum 17, in the proximity of the second end 23 of the cylindrical wall 18. In this example, the balancing ring of the second balancing device is mounted on the end wall 24 of the rotary drum 17, outside the drum. At the rear of the drum, it occupies a circular rim adjacent to the second end 23 of the cylindrical wall 18. The balancing ring 21 of the second balancing device is fastened to the rotary drum 17, e.g. by fastener means such as screws.

In another embodiment that is not shown, in which only one balancing device is fitted to the rotary drum, the balancing ring of that balancing device is preferably positioned substantially at equal distances between the first end and the second end of the cylindrical wall of said rotary drum.

Figure 5:
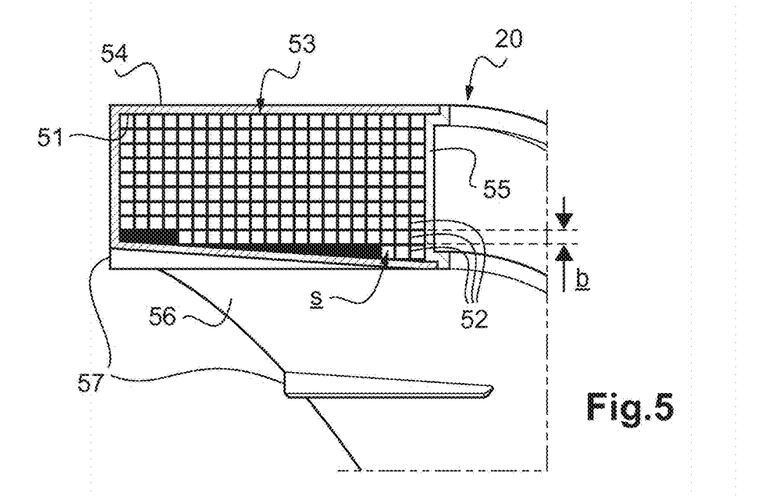
FIG. 5 is a detail view of a zone V in FIG. 4.
Figures 6, 7, 8:
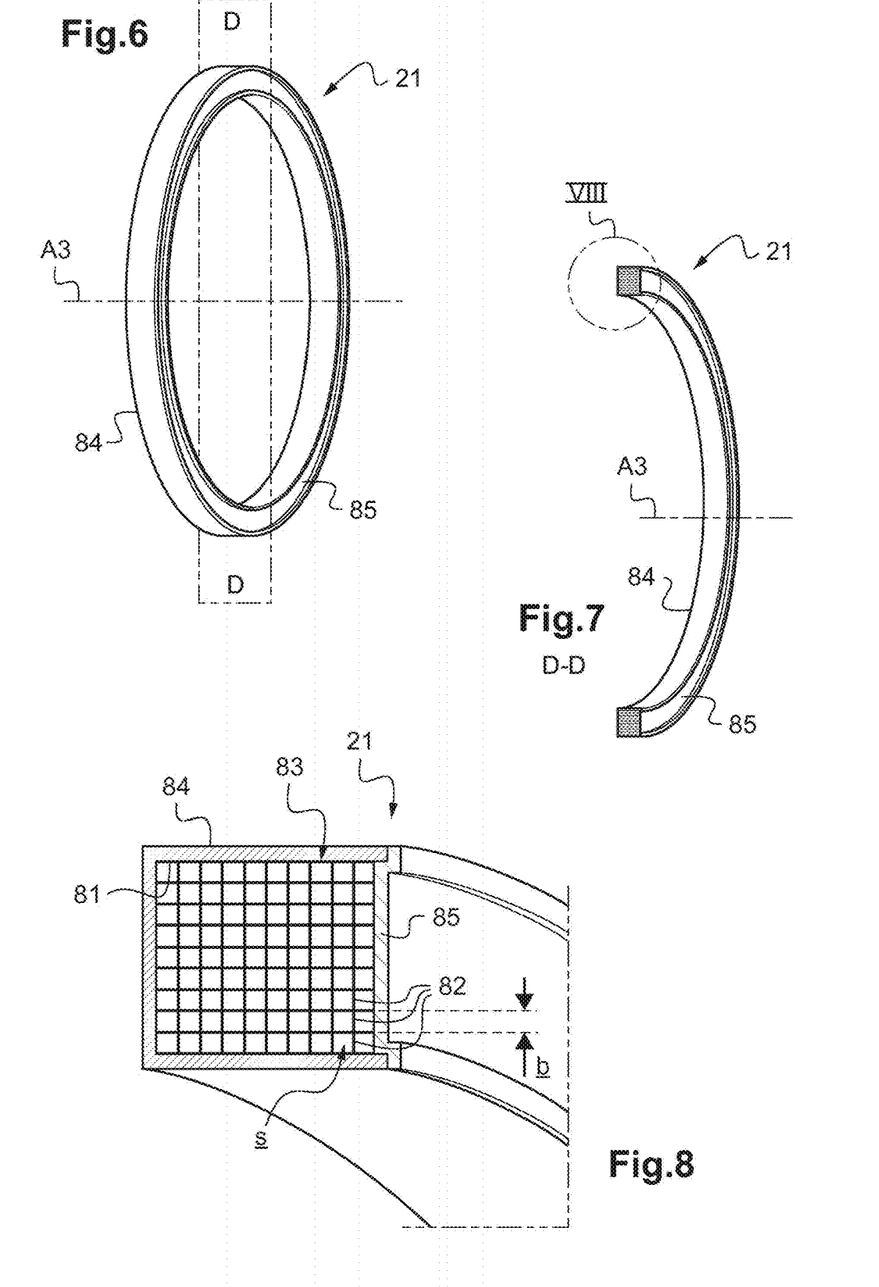
FIG. 6 is a diagrammatic perspective view of a balancing ring of a second balancing device of the FIG. 1 washing machine.
FIG. 7 is a section view on plane D-D of the FIG. 6 balancing ring.
FIG. 8 is a detail view of a zone VIII of FIG. 7.

As shown in detail in FIGS. 5 and 8, each balancing ring 20; 21 of each of the two balancing devices presents an inside space 51; 81 that is subdivided into a plurality of distinct channels 52; 82, said channels 52; 82 extending around the axis A2; A3 (see FIGS. 3, 4, 6, and 7) of said balancing ring 20; 21 over its entire circumference, with at least a portion of the channels 52; 82 each presenting in at least one direction a non-zero inside dimension b that is less than or equal to 3 millimeters.

Each channel 52; 82 of each balancing ring 20; 21 defines an inside volume, in this example a closed volume, that is in the form of a ring that is circularly symmetrical about the axis A2; A3 of each balancing ring 20; 21. In this example, the right section of the channel, which corresponds to a section of the channel 52; 82 on a plane containing the axis A2; A3 of the balancing ring 20; 21, is square. The right section of the channel 52; 82 is referred to more simply below as the section of the channel.

The inside volume of each channel can receive a balancing liquid, e.g. water or water with an additive such as salt or a wetting agent. The balancing liquid occupies in the range one-fourth to three-fourths of the inside volume of each channel, and in this example about half. The balancing liquid can flow in each channel all around the axis A2; A3. The way in which it is distributed within each channel while the washing machine 10 is in operation is explained below with reference to FIG. 11.

In this example, each channel presents an inside width b equal to about 1 millimeter (see FIGS. 5 and 8). The value of the inside width b may be adapted as a function of the speeds of rotation expected for the rotary drum 17 and as a function of the mean diameter of the corresponding balancing ring 20; 21. For a balancing ring 20; 21 of mean diameter equal to about 0.5 meters, the following values are preferably selected:

when the maximum speed of rotation expected for the rotary drum 17 is less than 600 rpm, b=2 millimeters;
when the maximum speed of rotation expected for the rotary drum 17 is less than 900 rpm, b=1.8 millimeters;
when the maximum speed of rotation expected for the rotary drum 17 is less than 1200 rpm, b=1.5 millimeters;

when the maximum speed of rotation expected for the rotary drum 17 is less than 1500 rpm, b=1 millimeter; and when the maximum speed of rotation expected for the rotary drum 17 is less than 1800 rpm, b=0.7 millimeters.

In a variant, for a balancing ring having a mean diameter of about 0.5 meters, the value of the inside width b may for example be selected as follows:

when the maximum speed of rotation expected for the rotary drum is less than 600 rpm, b=3 millimeters;

when the maximum speed of rotation expected for the rotary drum is less than 900 rpm, b=2.5 millimeters;

when the maximum speed of rotation expected for the rotary drum is less than 1200 rpm, b=2 millimeters;

when the maximum speed of rotation expected for the rotary drum is less than 1500 rpm, b=1.8 millimeters; and when the maximum speed of rotation expected for the rotary drum is less than 1800 rpm, b=1.5 millimeters.

In general manner, the inside width b of the channels 52; 82 is selected to be smaller with increasing speed of rotation of the rotary drum 17.

Furthermore, the inside width b of the channels 52; 82 is selected to be smaller with increasing mean radius of the balancing ring 20; 21. For example, when the maximum speed of rotation expected for the rotary drum 17 is less than 1200 rpm, the following values are preferably selected:

when the mean diameter is about 0.25 meters, b=1.6 millimeters;

when the mean diameter is about 0.5 meters, b=1.5 millimeters; and when the mean diameter is about 1 meter, b=0.8 millimeters.

In a variant, when the maximum speed of rotation expected for the rotary drum is less than 1200 rpm, the value of the inside width b may for example be selected as follows:

when the mean diameter is about 0.25 meters, b=2.5 millimeters;

when the mean diameter is about 0.5 meters, b=2 millimeters; and when the mean diameter is about 1 meter, b=1.5 millimeters.

In the presently-described embodiment, the channels 52; 82 of each balancing ring 20; 21 are square in section, as mentioned above. In other embodiments, not shown, they could present a section of shape that is circular, rectangular, hexagonal, or of any other shape.

The section of such a channel is then preferably dimensioned so that the circle inscribed within the section presents a diameter that is equal to said above-defined inside width b. The section of such a channel may also be dimensioned in such a manner as to present a mean inside width equal to said inside width b.

In particular, the section of such a channel is preferably dimensioned in such a manner that one of its inside dimensions is equal to said above-defined inside width b, this inside dimension corresponding in particular:

for a square section, to the inside diameter of the section;

for a rectangular section, to the inside width of the section;

for an elliptical section, to the minor inside diameter of the section;

for a section in the shape of a trapezoid, to the height of the trapezoid; and for a section in the shape of a parallelogram, to the smaller of the two heights of the parallelogram.

When a channel of the balancing ring presents a section that is longer than it is wide, e.g. a section that is rectangular or elliptical, the direction in which the section of the channel presents said inside width b preferably corresponds to a section that is radial relative to the balancing ring. Thus, when the section of the channel is rectangular, for example, the section is preferably narrow in a direction that is radial relative to the balancing ring, whereas it could possibly be longer in the axial direction of the ring.

Such channels may also be dimensioned in such a manner as to present an inside section s of 2 square millimeters.

The value of this section s may be adapted as follows, as a function of the speeds of rotation expected for the rotary drum and as a function of the mean diameter of the corresponding balancing ring.

For a balancing ring having a mean diameter of about 0.5 meters, the following values are preferably selected:

when the maximum speed of rotation expected for the rotary drum is less than 600 rpm, s=4 square millimeters;

when the maximum speed of rotation expected for the rotary drum is less than 900 rpm, s=3.3 square millimeters;

when the maximum speed of rotation expected for the rotary drum is less than 1200 rpm, s=2.25 square millimeters;

when the maximum speed of rotation expected for the rotary drum is less than 1500 rpm, s=1 square millimeter; and when the maximum speed of rotation expected for the rotary drum is less than 1800 rpm, s=0.5 square millimeters.

In a variant, for a balancing ring having a mean diameter of about 0.5 meters, the value of the section s may for example be selected as follows:

when the maximum speed of rotation expected for the rotary drum is less than 600 rpm, s=9 square millimeters;

when the maximum speed of rotation expected for the rotary drum is less than 900 rpm, s=6 square millimeters;

when the maximum speed of rotation expected for the rotary drum is less than 1200 rpm, s=4 square millimeters;

when the maximum speed of rotation expected for the rotary drum is less than 1500 rpm, s=3 square millimeter; and when the maximum speed of rotation expected for the rotary drum is less than 1800 rpm, s=2 square millimeters.

In general manner, the section s of the channels is selected to be smaller for increasing speed of rotation of the rotary drum.

Furthermore, the section s of the channels is selected to be smaller for increasing mean radius of the corresponding balancing ring. For example, when the maximum speed of rotation expected for the rotary drum is less than 1200 rpm, the following values are preferably selected:

when the mean diameter is about 0.25 meters, s=2.5 square millimeters;

when the mean diameter is about 0.5 meters, s=2.25 square millimeters; and when the mean diameter is about 1 meter, s=0.7 square millimeters.

In a variant, when the maximum speed of rotation expected for the rotary drum is less than 1200 rpm, the value of the section s may for example be selected as follows:

when the mean diameter is about 0.25 meters, s=6 square millimeters;

when the mean diameter is about 0.5 meters, s=4 square millimeters; and when the mean diameter is about 1 meter, s=2 square millimeters.

In another embodiment of the balancing device in accordance with the invention, adapted to speeds of rotation lower than 1200 rpm, the balancing ring of the device may comprise channels each presenting a section lying in the range 2 square millimeters to 4 square millimeters.

In yet another embodiment (not shown) of the balancing device in accordance with the invention, the balancing ring of the device may have channels presenting sections of different values. For example, one portion of the channels of said balancing ring may each present a section equal to 3 square millimeters, and another portion of the channels of the same balancing ring may each present a section equal to or less than 2 square millimeters.

In a preferred embodiment, all of the channels 52; 82 of each balancing ring 20; 21 are made in the form of a flexible strip that is wound end to end to form a flexible ring 53; 83 that is provided with said channels 52; 82 (see FIGS. 5 and 8). For each of said flexible strips, its two ends are joined in leaktight manner by a junction element 90; 100 (see FIGS. 9 and 10), after introducing the balancing liquid that fills the inside volume of each of said channels 52; 82, in part, as explained above.

Figures 9, 10, 11:
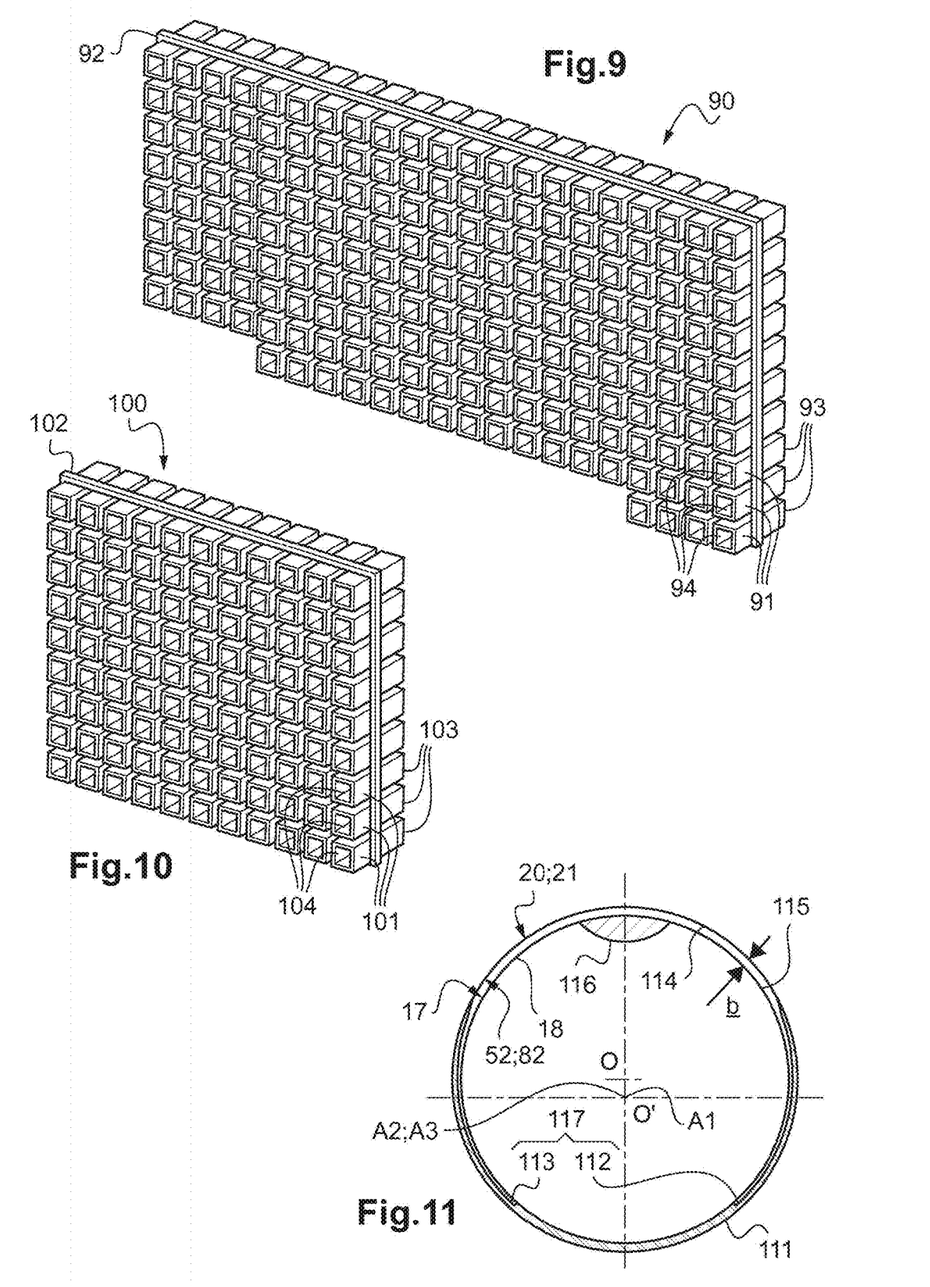
FIG. 9 is a diagram showing a junction element of the FIG. 3 balancing ring.
FIG. 10 is a diagram of a junction element of the FIG. 6 balancing ring.
FIG. 11 is a diagram showing the rotary drum of the FIG. 1 washing machine and the FIG. 3 balancing ring partially filled with a balancing liquid at a given instant while the rotary drum is rotating at high speed.

Each junction element 90; 100 comprises a plurality of ducts 91; 101 arranged adjacent to one another. These ducts 91; 101 may for example be secured to one another by a wall 92; 102. They are arranged within each junction element 90; 100 in a manner that is comparable to the way in which the channels 52; 82 are arranged within the corresponding flexible strip. For each junction element 90; 100, a duct 91; 101 thus occupies a position facing each of the channels 52; 82 of the corresponding flexible strip, when the junction element 90; 100 is put into place.

Each of these ducts 91; 101 presents:

a length that is short relative to the length of one of the channels 52; 82 of the corresponding balancing ring 20; 21 (e.g. equal to about $\frac{1}{100}^{th}$ of the length of such a channel); and an outside section that is complementary to the (inside) section of said channels 52; 82 (thus a square section in this example presenting an outer side of width b).

A first end 93; 103 of each of said ducts 91; 101 of each junction element 90; 100 is engaged, in this example as a force fit, through a first end of the corresponding channel 52; 82 of said corresponding flexible strip. The second end 94; 104 of the duct is also engaged, in this example as a force fit, in the second end of the same channel 52; 82, thus ensuring that its inside volume is leaktight and continuous. Provision may also be made for the first and second ends of the channel 52; 82 to be adhesively bonded or welded to the corresponding end 93, 94; 103, 104 of said duct 91; 101 in order to improve the leaktightness and the durability of the resulting junction.

Each junction element 90; 100 is preferably made by molding a partially rigid plastics material, e.g. acrylonitrile butadiene styrene.

The flexible strip having its two ends joined together by the junction element 90; 100 is thus made as a single piece, by extruding a plastics material through a die.

In a variant, in order to be easier to be rolled up end to end, said flexible strip may be made in the form of a plurality of distinct ribbons of plastics material, each having a portion of the channels, the ribbons being superposed on one another in order to form the flexible strip. By way of example, such a ribbon may be obtained by being cut out from a plate of cellular polypropylene presenting channels of appropriate size.

In this variant, the above-mentioned junction element preferably comprises a plurality of junction pieces, each of these junction pieces being made up of a portion of the duct of the junction element secured to one another.

Each ribbon is then rolled end to end and its two ends are joined together in leaktight manner by one of the junction pieces. These ribbons can thus be handled independently of one another and they are subsequently superposed on one another in concentric manner so as to form the flexible ring of the balancing device.

Each balancing ring 20; 21 of each balancing device in this example comprises a flexible ring 53; 83 provided with said channels 52; 82 and a casing 54; 84 closed by a cover 55; 85 (see FIGS. 5 and 8).

Each casing 54; 84 is an annular section member of axis corresponding to the axis A2; A3 of the corresponding balancing ring 20; 21, and being generally in the shape of a channel section, the web of the channel section extending radially relative to the axis A2; A3 of said balancing ring 20; 21.

Each cover 55; 85 is a substantially flat annular section member about the same axis, having the same mean radius and the same radial width as the corresponding casing 54; 84.

Each flexible ring 53; 83 of each balancing ring 20; 21 is inserted in the circular groove defined by the corresponding casing 54; 84, said groove subsequently being closed in leaktight manner by the corresponding cover 55; 85.

Each cover 55; 85 is fastened to the corresponding casing 54; 84, e.g. by welding or by adhesive, or because it is engaged as a force fit in the circular groove defined by the casing 54; 84.

It should be recalled that the balancing ring 20 of the first balancing device in this example is mounted around the cylindrical wall 18 of the rotary drum 17. During a stage of spin drying, the liquid extracted from the laundry being processed is discharged from the rotary drum 17 through holes provided for this purpose in the cylindrical wall 18.

Thus, in order to avoid impeding the discharge of this liquid, the casing 54 of the balancing ring 20 of the first balancing device presents, facing the axis A2 of the ring, a face 56 that its frustoconical, sloping slightly relative to the cylindrical wall 18 of the rotary drum 17 so that a space is left between them through which said liquid can be discharged during spin drying. This frustoconical face 56 is provided with splines 57 (also visible in FIGS. 1 and 3), enabling the casing 53 to be bear against the outside face of the cylindrical wall 18 of the rotary drum 17.

The material constituting each casing 54; 84 and each corresponding cover 55; 85 is selected so as to be undamaged by the effect of temperature or of contact with the liquids used for processing laundry. By way of example, the material may be a partially rigid plastics material such as acrylonitrile butadiene styrene. Likewise, the plastics material constituting each flexible ring 53; 83, e.g. polypropylene, and the plastics material forming each corresponding junction element 90; 100 are selected so as to withstand the temperatures used for processing laundry (in particular so as to present a long lifetime when subjected to a temperature of 90° C.)

With reference to FIG. 11, there follows a description of the operation of the washing machine 10 that has a rotary drum 17 having mounted coaxially thereon the balancing ring 20; 21 of a balancing device of the invention as described in detail above, containing a balancing liquid 111, and rotating at high speed.

The rotary drum 17 on which the balancing ring 20; 21 is mounted contains a load of laundry for processing 116 pressed against the inside face of its side wall 18 and representing a mass having its center of gravity located off-center relative to the axis of rotation A1 of the drum.

Because of its off-center position, the mass of laundry 116 contained in the rotary drum 17 exerts stresses thereon that cause rotation of the drum to be accompanied by substantially circular movement of its axis A1, as mentioned above. By way of example, in FIG. 11, the axis A1 of the drum is situated at a position O' that is different from the position O that it occupies at rest; the distance OO' shown in FIG. 11 is a diagrammatic distance serving merely to illustrate this concept.

In FIG. 11, there can be seen in particular one of the channels 52; 82 of the balancing ring 20; 21 together with the balancing liquid 111 that it contains.

Under the effect of the axis A1 of the rotary drum 17 moving, the balancing liquid 111 contained in the channel 52; 82 and localized in a portion only of the length of this channel by the surface tension effect, takes up a position in the channel 52; 82 that is diametrically opposite the mass of laundry 116 relative to the axis A1 of the drum.

More particularly, the centrifugal force that acts on the balancing liquid 111 as a result of the rotation of the rotary drum 17 to which the balancing ring 20; 21 is fastened tends to spread the balancing liquid 111 over the entire circumferential length of the channel 52; 82 at a maximum distance from the axis A2; A2 of the balancing ring 20; 21 against the portion 114 of the inside face of the wall of the channel 52; 82 that is furthest from the axis A2; A3 of the balancing ring 20; 21, which it should be recalled coincides with the axis A1 of the rotary drum 17.

In contrast, the surface tension acting at the free surface 117 of the balancing liquid 111 tends to reduce the area of this free surface 117 so as to maintain the balancing liquid 111 in the form of a column of liquid occupying the entire section of the channel 52; 82, but over only a segment of its length, the column being defined by two meniscuses 112 and 113, each meniscus 112; 113 bearing against the inside face of the wall of the channel 52; 82, in particular on the portion 115 of the inside face of the wall of the channel 52; 82 that is closest to the axis A2; A3 of the balancing ring.

The inside width b of the channel 52; 82, selected in compliance with the indications given above, is advantageously sufficiently small to ensure that the above-described surface tension effect dominates the effect of the centrifugal force to which the balancing liquid 111 is subjected, thereby preventing the balancing liquid 111 from spreading over the entire length of the channel 52; 82.

Thus, in this position, the mass of the balancing liquid 111 counterbalances the mass of the laundry 116, and effectively reduces the overall unbalance.

The greater the mass of the laundry 116 that needs to be balanced, the greater the offset OO' it induces for the axis A1. The drive force acting on the balancing liquid 111 is also greater when the offset OO' of the axis A1 is large.

Consequently, the quantity of the balancing liquid 111 that finally remains in opposition to the mass of laundry 116 increases with increasing mass to be balanced of the laundry 116. The mass of the balancing liquid 111 that is actually performing a balancing function thus continuously adapts as closely as possible to the mass of laundry 116 to be balanced.

This property is particularly advantageous for a washing machine 10, for example, since:
   the mass of laundry initially introduced into the drum may vary from one use to another of the washing machine 10; and
   the mass that needs to be balanced also varies greatly between the beginning and the end of a stage of spin drying; at the beginning of the stage of spin drying, the mass of laundry that needs to be balanced is large since it still contains a large amount of liquid, whereas at the end of the stage of spin drying, the mass of the laundry that needs to be balanced is smaller, since a large portion of the liquid that the laundry initially contained has already been discharged.

The use of a balancing device as described above thus ends up being particularly effective for balancing a rotary drum 17 of a machine 10 rotating at high speed and containing a free mass, e.g. a mass of laundry, which mass may also vary while the machine 10 is in operation.

When the machine 10 is a washing machine, this advantageous effect of the mass of balancing liquid that is actually performing a balancing function adapting to the mass that needs to be balanced, e.g. laundry of mass that varies during a spin-drying stage, can be enhanced by using a balancing ring having channels that present sections of different values.

A portion of the channels of said balancing ring may for example each present a section equal to 3 square millimeters, and another portion of the channels of the same balancing ring may each present a section less than or equal to 2 square millimeters, as mentioned above.

In such an embodiment, all of the channels of the corresponding balancing ring contribute to balancing the rotary drum and the free mass that it contains so long as the speed of rotation of the drum is not too high; in this example, so long as it is less than about 900 rpm. For high speeds of rotation, e.g. for speeds of rotation higher than 900 rpm, only the narrower channels participate to balancing the rotary drum, since the above-described surface tension effect is no longer necessarily sufficient to maintain the balancing liquid contained in the larger channels over a portion only of their length.

At the beginning of a spin-drying stage, speeds of rotation are moderate, and the free mass that needs to be balanced is large. Advantageously, in such an embodiment, the mass of balancing liquid that is actually performing a balancing function is then large (because of the moderate speed of rotation of the rotary drum), with the balancing liquid contained in each of the channels of said ring then contributing to the balancing.

In contrast, at the end of a stage of spin drying, the speeds of rotation are high, and the free mass for balancing is smaller. Advantageously, the mass of the balancing liquid that is actually performing a balancing function is then smaller (because of the high speed of rotation of the rotary drum, as explained above).

Furthermore, mounting a balancing device on the outside of the rotary drum 17 makes it possible:
   to conserve all of the inside volume of the drum for an article or a substance that is to be processed, laundry in this example; and
   to increase the performance of the balancing device because of the greater radius of its balancing ring 20; 21 (compared with installing said balancing device inside the rotary drum 17), thereby giving a greater lever arm to the mass of balancing liquid contained in said ring 20; 21.

Finally, having two balancing devices situated at different positions along the axis A1 of the rotary drum 17 of the machine 10, as shown in FIG. 2, makes it possible not only to correct static unbalance, but also to correct couple unbalance of the drum, thereby optimizing reduction of the vibration that would otherwise be generated by rotation of the drum.

Positioning each of the two balancing devices at a respective end of the rotary drum 17 also makes it possible to correct the static unbalance and the couple unbalance of the drum with optimum efficiency. Specifically, this arrangement ensures that the mass of laundry to be balanced is positioned along the axis A1 of the rotary drum between the two masses of balancing liquid contained in each of the rings 20; 21 corresponding to respective ones of the balancing devices. This configuration is particularly stable mechanically and advantageously makes it possible to reduce the mass of balancing liquid 111 needed for balancing a given free mass.

The present invention is not limited in any way to the embodiments described and shown, and persons skilled in the art can apply any variation thereto as they see fit.

In particular, provision could be made for a balancing device as described above advantageously to be fitted to a washing machine having a vertical axis.

Such a balancing device could also advantageously be fitted to the drum of a centrifuge, providing the inside dimensions of the channels of its balancing ring are appropriately adapted to the speeds of rotation used in the centrifuge, in compliance with the indications given above.

More generally, a balancing device as described above is well adapted to balancing a rotary drum rotating at high speed and intended to receive a free mass, or else a mass of value and of positioning within the rotary drum that are not firmly determined.

Such a balancing device may also advantageously be fitted to a rotary drum (e.g. a drive shaft) of a turbine rotating at high speed, likewise providing the inside dimensions of the channels of its balancing ring are appropriately adapted to the speeds of rotation used in the turbine, in compliance with the indications given above. For such a turbine rotary drum (e.g. a drive shaft), unbalance relative to the axis of rotation can appear during the life cycle of the turbine, e.g. as a result of wear of the rotary parts it comprises. Such unbalance is then corrected by means of the balancing device without an expensive maintenance operation on the turbine being necessary.

The invention claimed is:

1. A device for balancing a machine with a rotary drum, the device comprising:
   at least one balancing ring configured to be mounted coaxially on the rotary drum, the ring defining an inside space subdivided into a plurality of distinct capillary channels, said channels extending around the axis of said balancing ring over its entire circumference, wherein at least some of the channels are each filled with a balancing liquid occupying a volume lying the range of one-fourth to three-fourths of the inside volume of the channel, each of the channels having, in a direction radial with respect to the axis of the balancing ring, a mean inside dimension that is not zero and less than or equal to 3 millimeters, thereby preventing the balancing liquid from spreading over the entire length of the channel.

2. The balancing device according to claim 1, wherein said mean inside dimension lies in the range 0.5 millimeters to 2 millimeters.

3. The balancing device according to claim 1, wherein each of said channels has a section lying in the range 2 square millimeters to 4 square millimeters.

4. The balancing device according to claim 1, wherein each of said channels has a section of less than 2 square millimeters.

5. A balancing device according to claim 4, wherein each of said channels has a wall that defines a closed inside volume.

6. The balancing device according to claim 1, wherein each of said channels has a wall that defines a closed inside volume.

7. A machine comprising:
   a rotary drum fitted with the balancing device according to claim 6.

8. The machine according to claim 7, wherein the machine constitutes a washing machine.

9. The balancing device according to claim 1, wherein said channels together form a flexible strip of plastic material wound to form a flexible ring, two ends of said flexible strip being joined together in a leaktight manner by a junction element providing continuity for the inside volume of each channel.

10. A machine comprising:
    a rotary drum fitted with two balancing devices each according to claim 9, the two balancing devices being mounted respectively in the proximity of two opposite ends of the cylindrical wall of said rotary drum.

11. The machine according to claim 10, wherein the machine constitutes a washing machine.

12. A machine comprising:
    a rotary drum fitted with the balancing device according to claim 9.

13. The machine according to claim 12, wherein the machine constitutes a washing machine.

14. A machine comprising:
    a rotary drum fitted with the balancing device according to claim 1.

15. The balancing device according to claim 1, wherein said balancing liquid is water or water with an additive.

* * * * *